(12) United States Patent
Gabbianelli et al.

(10) Patent No.: US 7,091,440 B2
(45) Date of Patent: Aug. 15, 2006

(54) SPOT WELDING ASSEMBLY

(75) Inventors: Gianfranco Gabbianelli, Troy, MI (US); Victor J. Malczewski, Auburn Hills, MI (US)

(73) Assignee: Magna International Inc., Ontario (CA)

( * ) Notice: Subject to any disclaimer, the term of this patent is extended or adjusted under 35 U.S.C. 154(b) by 204 days.

(21) Appl. No.: 10/450,783

(22) PCT Filed: Dec. 20, 2001

(86) PCT No.: PCT/US01/48841

§ 371 (c)(1),
(2), (4) Date: Jun. 18, 2003

(87) PCT Pub. No.: WO02/055253

PCT Pub. Date: Jul. 18, 2002

(65) Prior Publication Data

US 2004/0065641 A1    Apr. 8, 2004

Related U.S. Application Data

(60) Provisional application No. 60/256,494, filed on Dec. 20, 2000.

(51) Int. Cl.
*B23K 11/10* (2006.01)

(52) U.S. Cl. ........................................ 219/87; 219/91.2

(58) Field of Classification Search .................. 219/87, 219/86.1, 91.2, 86.9, 117.1
See application file for complete search history.

(56) References Cited

U.S. PATENT DOCUMENTS

| | | | | | |
|---|---|---|---|---|---|
| 1,052,753 | A | * | 2/1913 | Rietzel | 219/86.1 |
| 1,269,617 | A | * | 6/1918 | Ledwinka | 219/87 |
| 3,076,086 | A | * | 1/1963 | Adams | 219/86.1 |
| 3,128,367 | A | * | 4/1964 | Darmon et al. | 219/86.1 |
| 4,963,712 | A |  | 10/1990 | Etoh et al. | |
| 5,708,248 | A |  | 1/1998 | Poss et al. | |

FOREIGN PATENT DOCUMENTS

| | | |
|---|---|---|
| EP | 0 535 343 A2 | 4/1993 |
| EP | 0 535 343 A3 | 4/1993 |
| JP | 62-89579 | 4/1987 |

* cited by examiner

*Primary Examiner*—Clifford C. Shaw
(74) *Attorney, Agent, or Firm*—Pillsbury Winthrop Shaw Pittman, LLP

(57) ABSTRACT

A welding assembly including a welding gun for providing spaced welds on opposite sides of members being welded. The welding gun includes two welding tips so that both welds can be formed without moving the gun or the members relative to each other. Preferably one weld tip is connected to a force applying mechanism such as a hydraulic cylinder to clamp the members together and improve the connection between the weld tips and the members. The weld gun can be used for making one or two welds while in the engaged position around the members being welded. Also, one of the weld tips can be replaced with a support that merely provides the force applying function.

18 Claims, 4 Drawing Sheets

SPOT WELDING ASSEMBLY

This application is the National Phase of International Application PCT/US01/48841 filed Dec. 20, 2001 which designated the U.S. and that International Application was published in English under PCT Article 21(2) on Jul. 18, 2002 as International Publication Number WO 02/055253 A1. PCT/US01/48841 claims priority to U.S. Provisional Application No. 60/256,494, filed Dec. 20, 2000. The entire contents of these applications are incorporated herein by reference.

FIELD OF THE INVENTION

The present invention relates generally to a welding assembly. More specifically, the present invention relates to a spot welding assembly that provides spaced welds on opposite sides of a weldable member.

BACKGROUND OF THE INVENTION

Indirect spot welding devices typically comprise a single welding tip. During a welding operation, the single welding tip is brought into contact with one side of the members to be welded and a second contact is applied near the joining area to complete the circuit. Electrical current is then applied through the welding tip conducted out through the contact gun to form a single weld on one side of the members. Such spot welding devices are inefficient if a second spaced weld on an opposite side of the members is desired, since to produce the opposite weld requires that either the members being welded or the welding device itself be physically moved to properly locate the single welding tip on the opposite side of the members. Only after the prior art spot welding device has been moved relative to the members being welded can the second weld be created.

An example of a one-sided spot welding device is disclosed in U.S. Pat. No. 5,708,248 to Poss et al., the disclosure of which is incorporated herein by reference.

Thus, there is a need for a welding device that can provide spot-welds on both sides of members being welded without moving the members or the welding device. The present invention addresses this need in the art as well as other needs, which will become apparent to those skilled in the art once given this disclosure.

SUMMARY OF THE INVENTION

One object of the present invention is to provide an indirect resistance welding device for joining weldable members together.

Another object of the invention is to provide a spot welding device that provides spaced welds on opposite sides of the members being welded without moving the welding device relative to the members being welded.

Yet another object of the invention is to provide a welding device to spot weld a first member to a closed section tubular member.

Still a further object of the invention is to provide a welding device which can join a first member to a closed section tubular member with single-sided spot-welds on both sides of the closed section member without inside support of the area to be welded.

The foregoing objects are basically attained by providing a welding device, comprising a main member; a first welding part coupled to the main member and having a first conductive end; a second welding part coupled to the main member and having a force applying mechanism applying a force in a first direction and a second conductive end extending from the force applying mechanism, the second conductive end being movable between a disengaged position and a welding position, the first and second conductive ends being opposite to and facing each other when the second conductive end is in the welding position; and a grounding element electrically coupled to the first conductive end during formation of a first weld and electrically coupled to the second conductive end during formation of a second weld.

The foregoing objects are further attained by providing a combination of a welding device and at least one weldable member, the combination comprising a welding device assembly having a first welding part, a second welding part, and a grounding element. The first welding part has a first conductive end and the second welding part has a force applying mechanism and a second conductive end extending from the force applying mechanism. The second conductive end is movable between a disengaged position and a welding position. A first member and second member is positioned between the first and second conductive ends. The second conductive end is forced against the second member by the force applying mechanism to couple the first and second conductive ends and the first and second members together. The first and second members are joined by a first weld adjacent the first conductive end and by a second weld adjacent the second conductive end.

The foregoing objects are still further attained by providing a method of welding comprising the step of providing a welding device assembly having a first welding part and a second welding part. The first welding part has a first conductive end and the second welding part has a second conductive end. The method comprises the step of providing first and second members positioned between the first and second conductive ends with the first member having a longitudinal axis and a closed cross-section transverse to the longitudinal axis. The method comprises the steps of forming a first weld between the first and second members with the first conductive end and forming a second weld between the first and second members with the second conductive end.

These and other objects, features, and advantages of this invention will become apparent from the following detailed description when taken in conjunction with the accompanying drawings, which are a part of this disclosure and which illustrate, by way of example, the principles of this invention.

BRIEF DESCRIPTION OF THE DRAWINGS

The accompanying drawings facilitate an understanding of the various embodiments of this invention. In such drawings.

DETAILED DESCRIPTION OF THE INVENTION

Figure 1:
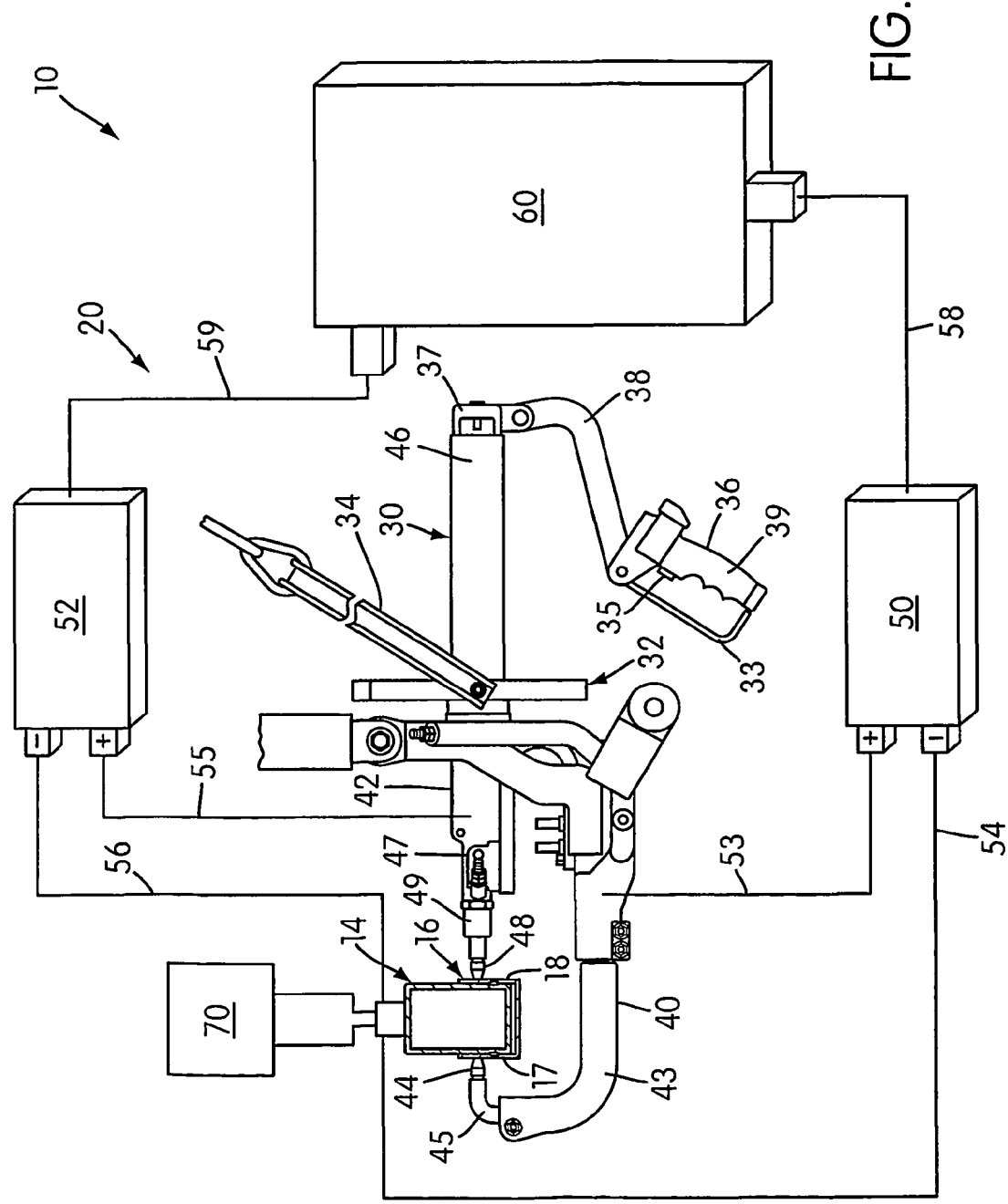
FIG. 1 is a side view of a welding device in accordance with the present invention within a schematic view of a welding assembly constructed in accordance with the principles of the present invention.

FIG. 1 illustrates a welding assembly, generally shown at 10, which welding assembly 10 embodies the principles of the present invention. The welding assembly 10 includes a welding device assembly 20 and first and second members 14, 16, which are to be joined together. The welding device assembly 20 includes a welding device or welding gun, generally shown at 30, first and second transformers 50, 52, a controller 60, and a grounding element 70.

The first member 14 is illustrated as having a longitudinal axis and a closed cross-section transverse to the longitudinal axis. In the illustrated embodiment, the first member 14 is tubular and may be in the form of a hydroformed member. The second member 16 is illustrated in the form of a gusset, such as a sheet metal gusset, which adds strength and stiffness to the first member 14 when joined thereto. Although the second member 16 is described as a gusset, any appropriate weldable member can be used with the welding device assembly 20.

In the preferred embodiment, the welding device assembly 20 is used to weld first and second members 14 and 16 where at least one of the members has a closed cross-section, which prohibits the weld gun 30 from directly clamping on both sides of the area to be welded. The invention is particularly beneficial when it is desired to weld a hydroformed tubular member to a second member 16 that can be any appropriate member to be welded to the first member 14, such as a sheet metal member. However, the members 14 and 16 can be in any form needing to be welded together around which the gun 30 will fit and operate to form the desired welds. For example, the first member 14 can have an open cross-section but with an opening that does not lend itself to access by a welding device. Also, the first and second members 14 and 16 can take any shape and have any shape cross-section. For instance, first member 14 can be circular or square in cross-section. An advantage of the present invention is that the welding device assembly 20 can join the second member 16 to the first member 14 with single-sided spot-welds on both sides of the first member 14 without inside support of the area to be welded and, thus, the assembly 20 can weld various types of members together that present a welding situation similar to that with members 14 and 16.

The welding device 30, or weld gun, includes a gun body, generally shown at 32, which can be pivotally mounted to one end of a mounting fixture 34. The opposite end of the mounting fixture 34 can be secured to an apparatus (not shown) such that the weld gun 30 is spaced from the ground and movable between welding positions. The mounting fixture 34 can permit the weld gun 30 to move in various ways as necessary for the application of the weld gun 30. For example, the fixture 34 can provide movement of the weld gun 30 about a pivot axis 31, so that the weld gun 30 can be moved or tilted to multiple welding positions.

The weld gun 30 has a first welding part 40 and a second welding part 42. The first and second welding parts 40 and 42 are mounted to the gun body 32. The first welding part 40 has a first conductive end 44, in the form of a first welding tip or electrode 44. The second welding part 42 has a force applying mechanism 46, illustrated as a force-applying cylinder in a first plane 76 and a second conductive end 48, in the form of a second welding tip or electrode, extending from the force applying mechanism 46.

Any appropriate force applying mechanism 46 can be used. For example, the force applying mechanism can be an air cylinder or a hydraulic cylinder. A typical air cylinder for applying force to the members 14, 16 would generally be capable of exerting between 250 to 900 pounds of pressure. Preferably through the use of the cylinder 46, the second conductive end 48 is movable between a disengaged position (shown in solid lines in FIG. 4) and a welding position (shown in phantom or dashed lines in FIG. 4). This feature enables the weld gun 30 to be engaged and disengaged around joints and members 14 and 16 to be welded together, which further enables the weld gun 30 to be moved between welding positions.

Figure 2:
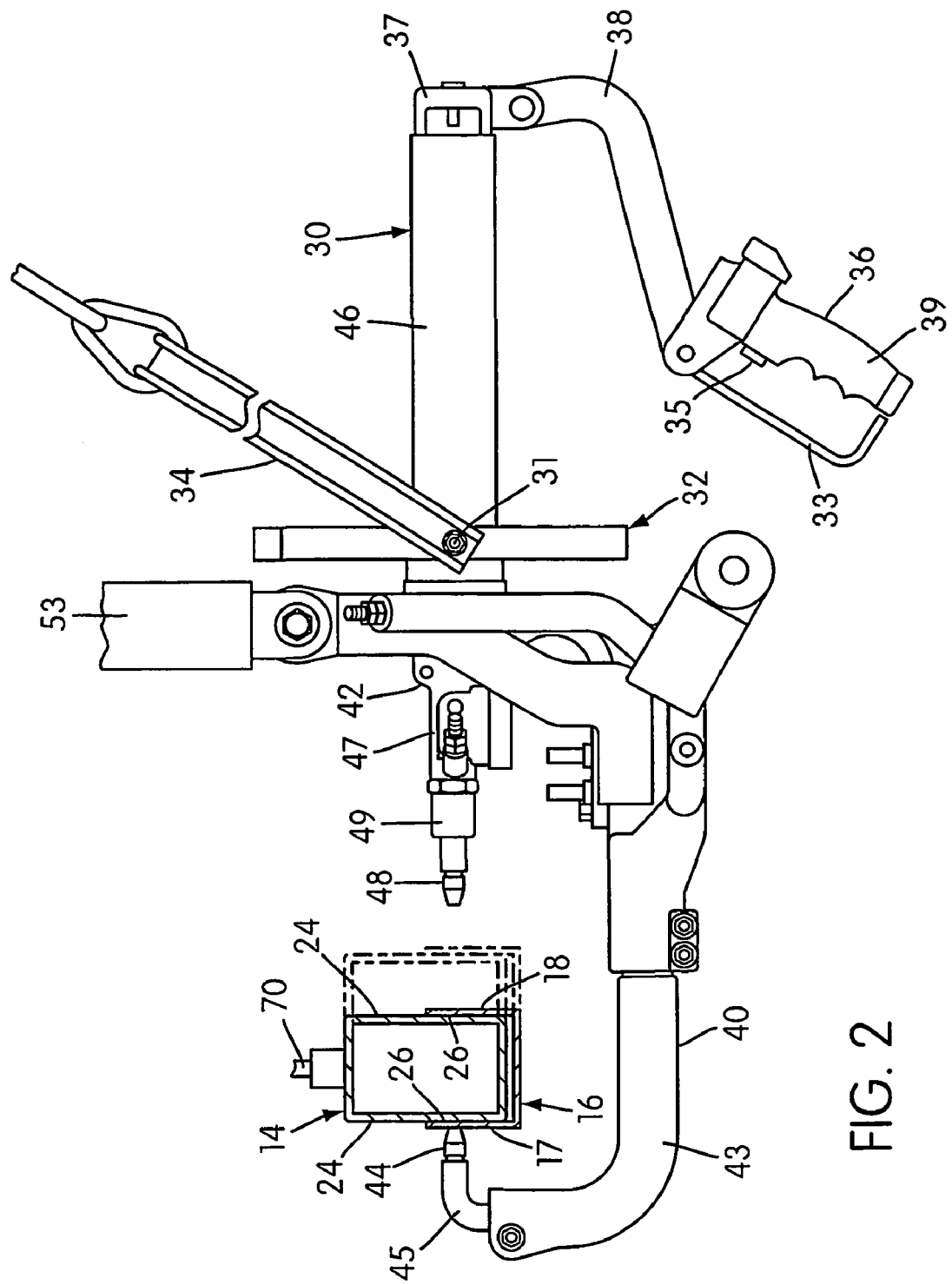
FIG. 2 is a side view of the welding device illustrated in FIG. 1 and in accordance with the present invention and illustrating larger sized members for welding in dashed lines.
Figure 3:
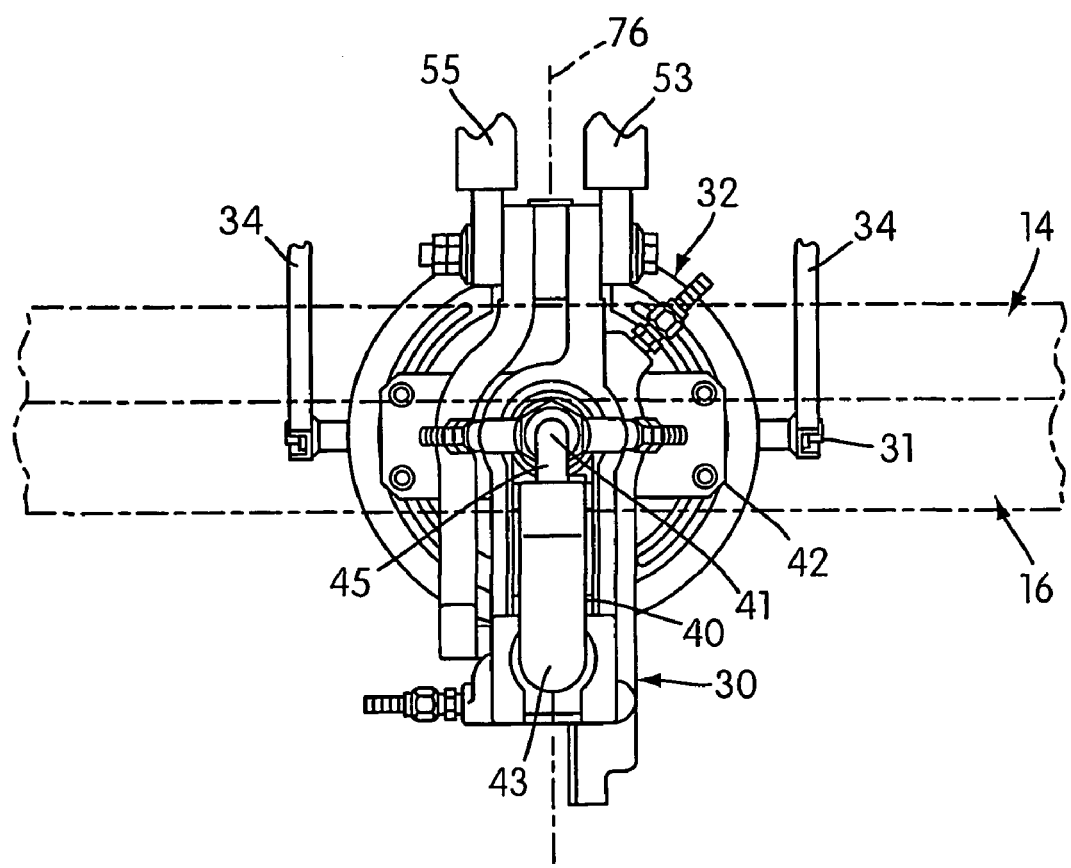
FIG. 3 is a front view of the welding assembly of FIG. 2 with the members being welding illustrated in dashed lines.

It should be noted that the space between the first and second conductive ends 44, 48 is sufficient to accommodate varying sizes of the first and second members 14, 16. For example, FIG. 2 shows a larger embodiment of members 14, 16 with the extended cross-section indicated in phantom. Thus, the cylinder 46 not only provides versatility in the amount of force applied to the members 14, 16 but also provides versatility in the location of the application of the force.

The first welding part 40 has a first conductive end holder 43, which holder 43 has an adapter 45 configured and positioned to mount the first conductive end 44. The second welding part 42 has a second conductive end holder 47 mounted to the force applying mechanism 46, which holder 47 has an adapter 49 configured and positioned to mount the second conductive end 48. The welding parts 40 and 42 can take various forms depending on the members to be welded together. For example, as illustrated, the second welding part 42 can be rotatably mounted to the gun body 32, such that the first and second welding parts 40, 42 can be rotated about an axis 41 for multiple welding positions.

If manually operated, the weld gun 30 can include a gun handle assembly 36, which handle assembly 36 can extend from the force applying mechanism 46. The handle assembly 36 can include a handle adapter 37 for mounting the assembly 36 to the force applying mechanism 46 and a handle extension 38 extending from the adapter 37. A gun handle 39 is secured to extension 38. The gun handle 39 includes a handle guard 33 and a trigger 35, which actuates the weld gun 30. The handle assembly 36 enables the operator to tilt the weld gun 30 about the pivot axis 31 and/or rotate the weld gun 30 about the axis 41 to multiple welding positions. Then, the weld gun 30 can be activated to created the welds as manipulated through the handle assembly 36.

It is contemplated that the gun handle assembly 36 may be replaced by an automated system such as a robot. The robot could be capable of moving the weld gun 30 to multiple positions about the structure to be welded to perform multiple welding operations without significant operator regulation or supervision. Of course, any combination of manual and computer or robotic manipulation can be employed to control the weld gun 30.

The grounding element 70, also referred to as a contact gun, contacts at least one of the first and second members 14, 16 during the welding operation to create the electrical path through the members 14 and 16, as will be further discussed.

The first welding part 40 is electrically coupled to the first transformer 50 and the second welding part 42 is electrically coupled to the second transformer 52. The first welding part 40 is electrically coupled to the first transformer 50 by electrical connectors or cables 53, 54. The second welding part 42 is electrically coupled to the second transformer 52 by electrical connectors or cables 55, 56. Cables 58, 59 electrically couple the first and second transformers 50, 52, respectively, to the controller 60, which dictates the operation and sequencing of the entire welding device assembly 20. As generally known in the art, the controller 60 can control the weld current and cycle time necessary to create the weld between the first and second members 14, 16 and also monitors the pressure in the force applying mechanism 46.

The operation of the welding device assembly 20 will now be described in greater detail. As mentioned, the weld gun 30 was developed to weld members to closed section members through indirect resistance spot welding. Indirect resistance spot welding is a process where a weld is created without the inside support of a weld tip.

Figure 4:
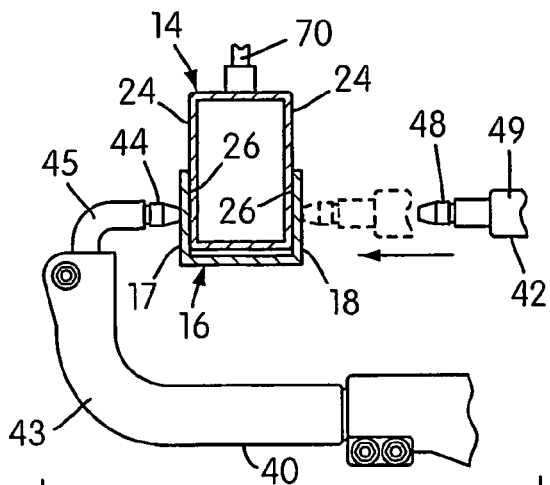
FIG. 4 is a partial side view of the welding device of FIG. 2 with the movable weld tip shown in the disengaged position in solid lines and in the engaged, welding position in dashed lines.
Figure 5:
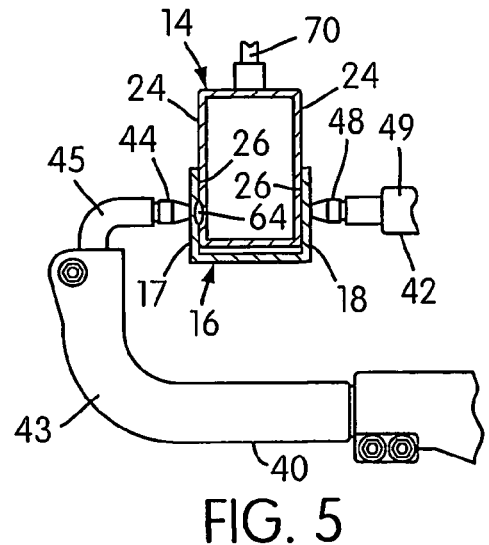
FIG. 5 is a partial side view of the welding device of FIG. 2 with the movable weld tip shown in the engaged, welding position and with the first weld formed on the left hand side.
Figure 6:
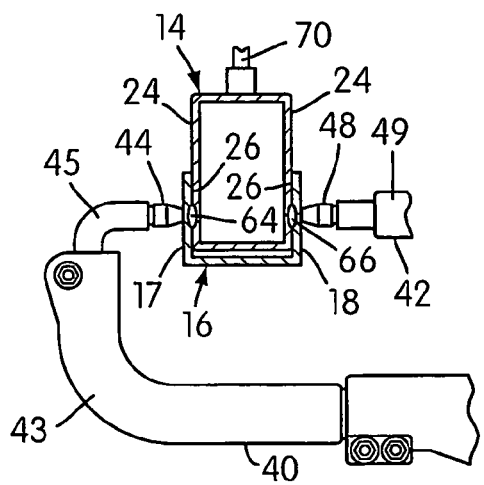
FIG. 6 is a partial side view of the welding device of FIG. 2 with the movable weld tip shown in the engaged, welding position and with the first and second welds formed.

Referring more particularly to FIGS. 4–6, the first and second members 14, 16 are first positioned between the first and second conductive ends 44, 48. The first member 14 (closed section member) is received within the second member 16 (sheet member) or the members 14 and 16 are appropriately abutting each other such that exterior surface 24 of the first member 14 engages the surface 26 of the second member 16 to which it is being welded. Further, the sides 17, 18 of the second member 16 face the first and second conductive ends 44, 48, respectively. The weld gun 30 is moved by the operator by the gun handle assembly 36 or by computer controlled mechanism to correctly position the conductive ends 44, 48 around the members 14, 16 for the welding operation. Specifically, the first conductive end 44 is positioned such that it contacts side 17 of the second member 16.

The operator, if manually operated, operates the handle assembly 36 which actuates the welding device assembly 20. The second conductive end 48 moves from the disengaged position, as shown in solid in FIG. 4, within plane 76 to the welding position, as shown in phantom in FIG. 4. Specifically, the second conductive end 48 is forced against side 18 of the second member 16 by the force applying mechanism 46 to couple the first and second conductive ends 44, 48 and the first and second members 14, 16 together. The first and second conductive ends 44, 48 preferably lie in the first plane 76 when the second conductive end 48 is in the welding position.

While the force applying mechanism 46 is activated, the first and second members 14, 16 are joined by the formation of a first weld 64 adjacent the first conductive end 44 (as shown in FIG. 5) and then by the formation of a second weld 66 adjacent the second conductive end 48 (as shown in FIG. 6). To form the first weld 64, electrical current is supplied by the first transformer 50 across the first and second members 14, 16 to the contact gun 70 such that the applied current melts the welding surfaces 24, 26 adjacent tip 44 and thereby welds the surfaces 24, 26 to one another to create the first weld 64 between members 14 and 16. That is, electrical current is discharged by the first transformer 50 through the first welding part 40 and the first conductive end 44 and into the members 14, 16. The current continues out through the grounding element 70, which is in contact with or otherwise electrically connected to the first member 14, to create the first spot weld 64. After melting occurs and the first weld 64 is formed, the current flowing through the surfaces 24, 26 from the first transformer 50 is switched off.

Then, the second transformer 52 is activated to supply electrical current through electrical connector 55, across the first and second members 14, 16 to the contact gun 70 such that the applied current melts the welding surfaces 24, 26 of the members 14, 16 adjacent tip 48 and thereby welds the surfaces 24, 26 to one another to create the second weld 66. That is, electrical current is discharged by the second transformer 52 through the second welding part 42 and the second conductive end 48 and into the members 14, 16. The current continues out through the grounding element 70, which is in contact with or otherwise electrically connected to the first member 14, to create the second spot weld 66. After melting occurs and the second weld 66 is formed, the current flowing through the surfaces 24, 26 from the second transformer 50 is switched off.

The grounding element 70 is electrically coupled to the first conductive end 44 during formation of the first weld 64 and is electrically coupled to the second conductive end 48 during formation of the second weld 66. Also, the first and second conductive ends 44, 48 enclose the members 14, 16 and apply pressure throughout both the first and second welds 64, 66.

Once both welds 64 and 66 are formed, the pressure applied by the force applying mechanism 46 is preferably removed to permit the weld gun 30 and the members 14 and 16 to be moved relative to each other to form additional welds at other location. Alternatively, if members 14 and 16 form a part of a larger structure such as an automobile frame, the weld gun 30 can be moved to a different positions along the frame to create welds at the various joints of the frame. Further, the weld gun 30 could be stationary and different members can be positioned between the weld tips 44 and 48 for subsequent welding.

The second spot weld 66 in the illustrated embodiment is performed after the first spot weld 64 is created. However, it is contemplated that the second spot weld 66 could be performed before the first spot weld 64 is created. The specific order of the welding can be dictated as desired or necessary. Also, the controlling of the transformers 50 and 52 can be such that the welds 64 and 66 occur within a very short time frame, even to the point that the weld 64 or 66 formed as the second weld occurs immediately after the first weld is complete. Thus, the weld gun 30 provides a way for the members 14 and 16 to welded in a very short time, especially relative to the prior art method that requires the prior art device to physically move after each single weld.

Alternatively, although weld gun 30 has the ability to form both welds 64 and 66, if desired, only one of the welds 64 or 66 can be formed without the second weld being formed.

Figure 7:
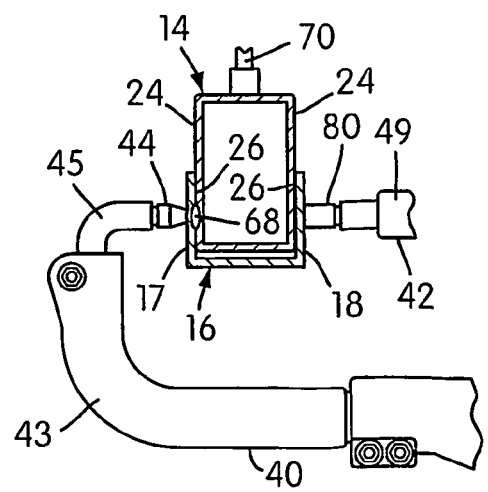
FIG. 7 is a partial side view of the welding device of FIG. 2 illustrating a second embodiment of the welding device in accordance with the present invention wherein the movable conductive end is a support member applying a force opposite the conductive member.

FIG. 7 illustrates a further embodiment of the weld gun 30 of the present invention wherein one of the conductive ends is replaced with a support member 80. Specifically, the embodiment shows the second conductive 48 end replaced with the support member 80, such that a weld 68 is performed only by the first conductive end 44. It is also contemplated that the first conductive end 44 may be replaced by the support member 80, such that the welding operation is performed by the second conductive end 48 only.

It can thus be appreciated that the objectives of the present invention have been fully and effectively accomplished. The foregoing specific embodiments have been provided to illustrate the structural and functional principles of the present invention and is not intended to be limiting. To the contrary, the present invention is intended to encompass all modifications, alterations, and substitutions within the spirit and scope of the appended claims.

What is claimed is:

1. A welding device comprising:
a main member;
a first welding part coupled to said main member and having a first conductive end;
a second welding part coupled to said main member and having a force applying mechanism applying a force in a first direction and a second conductive end extending from said force applying mechanism, said second conductive end being movable between a disengaged position and a welding position, said first and second conductive ends being opposite to and facing each other when said second conductive end is in said welding position; and
a grounding element electrically coupled to said first conductive end during formation of a first weld and electrically coupled to said second conductive end during formation of a second weld, and
said first welding part is coupled to a first transformer, and said second welding part is coupled to a second transformer.

2. A welding device according to claim 1, wherein
said first welding part and said second welding part are coupled together to form a weld gun having a handle that is structured and arranged to be grasped by a user's hand.

3. A welding device according to claim 2, wherein
said weld gun is coupled to a mounting structure that is structured and arranged to movably suspend the weld gun above the ground.

4. A welding device according to claim 1, further comprising:
a controller coupled to each of said first and second transformers, said controller structured and arranged to provide a first weld current from said first transformer to said first conductive end and a second weld current from said second transformer to said second conductive end.

5. A welding device according to claim 1, wherein
said force applying mechanism is a pressure cylinder.

6. A welding device according to claim 5, wherein
said pressure cylinder is connected to a handle that is structured and arranged to be grasped by a user's hand, said handle including an activating element to activate said pressure cylinder.

7. A welding device according to claim 1, wherein the pressure cylinder is a fluid cylinder.

8. A welding device according to claim 5, wherein
said pressure cylinder is structured and arranged to be generally capable of exerting between 250 to 900 pounds of pressure.

9. A method of welding comprising:
providing a welding device assembly having a first welding part and a second welding part, said first welding part having a first conductive end, and the second welding part having a second conductive end;
providing first and second members positioned between the first and second conductive ends with the first member having a longitudinal axis and a closed cross-section transverse to the longitudinal axis;
forming a first weld between the first and second members with the first conductive end; and
forming a second weld between the first and second members with the second conductive end
the first and second welds being formed while a pressure cylinder applies a force through the second conductive end against the first and second members and against the first conductive end, and
one of the first and second welds being formed before the other of the first and second welds, and the forming of the first and second welds occurring without moving the welding device away from the first and second members.

10. A method of welding according to claim 9, wherein
the welding device assembly is provided with a handle coupled to the first and second conductive ends, and
prior to forming the first and second welds, the first and second conductive ends are simultaneously positioned on opposite sides of the first and second members by a user grasping the handle and moving the welding device assembly.

11. A method according to claim 9, further comprising:
controlling the welding device assembly with a computer.

12. A method according to claim 9, wherein
applying the pressure to the second conductive end includes applying 250 to 900 pounds of fluid pressure to the pressure cylinder.

13. A method of welding, comprising:
positioning a welding device assembly around first and second weldable members to be joined by welding, including positioning a first conductive end of the welding device assembly on one side of first and second weldable members and positioning a second conductive end of the welding device assembly on an opposite side of the first and second weldable members;
applying pressure to the second conductive end to force the first and second weldable members together and to force the first and second weldable members against the first conductive end;
forming a first weld between the first and second members with one of the first and second conductive ends while the pressure is applied;
forming a second weld between the first and second members with the other of the first and second conductive ends after the first weld is formed and while the pressure is applied.

14. A method according to claim 13, wherein
the welding device assembly is provided with a handle coupled to the first and second conductive ends, and
the positioning of the welding device assembly includes simultaneously positioning the first and second members on opposite sides of the first and second weldable members by a user grasping the handle and moving the welding device assembly.

15. A method according to claim 13, wherein
applying the pressure to the second conductive end includes providing pressure to a pressure cylinder to move the second conductive end against the first and second weldable members.

16. A method according to claim 15, wherein
applying the pressure to the second conductive end includes applying 250 to 900 pounds of fluid pressure to the pressure cylinder.

17. A method according to claim 13, further comprising:
controlling the welding device assembly with a computer.

18. A method according to claim 17, wherein,
the controlling of the welding device by the computer includes controlling the pressure applied by the second conductive end, the weld current applied to each of the first and second conductive ends, and the time between the first and second welds.

* * * * *